INVENTORS
SHOICHI TERASAWA
KOTARO INOUE

BY Craig & Antonelli
ATTORNEYS

May 5, 1970  SHOICHI TERASAWA ET AL  3,510,399
CONTROL SYSTEM FOR FAST REACTORS
Filed Sept. 5, 1967  2 Sheets-Sheet 2

INVENTORS
SHOICHI TERASAWA
KOTARO INOUE

BY  Craig & Antonelli
ATTORNEYS

United States Patent Office 3,510,399
Patented May 5, 1970

3,510,399
CONTROL SYSTEM FOR FAST REACTORS
Shoichi Terasawa and Kotaro Inoue, Tokyo, Japan, assignors to Hitachi, Ltd., Tokyo, Japan
Continuation-in-part of application Ser. No. 531,845, Mar. 4, 1966. This application Sept. 5, 1967, Ser. No. 665,553
Claims priority, application Japan, Mar. 9, 1965, 40/13,261
Int. Cl. G21c 7/22
U.S. Cl. 176—86                                    8 Claims

ABSTRACT OF THE DISCLOSURE

A control system for a fast nuclear reactor comprising a core having a plurality of control tubes. At least a portion of the control tubes are arranged so as to be distributed exterior of the central portion of the core and means are provided for feeding a control material of liquid form to the control tubes. The level of liquid control material in the control tubes is controlled in a manner to assure that under all conditions of operation a space within the control tubes is left void of liquid control material at least within the exteriorly distributed control tubes. As a result spaces within the control tubes located exterior of the central portion of the reactor core are maintained void of liquid control material so as to provide radially extending paths from the central portion of the core which are void of liquid control material.

RELATED APPLICATIONS

This application is a continuation-in-part application of United States application Ser. No. 531,845, now abandoned, filed Mar. 4, 1966 entitled "Control System for Fast Reactors," Schoichi Terasawa and Kotaro Inoue inventors assigned to Hitachi Ltd. of Tokyo, Japan.

BACKGROUND OF INVENTION

Field of invention

This invention relates to fast reactors and more particularly to improved control systems for such reactors.

As is well known, fast reactors are nuclear reactors of the type having a core designed to maintain a nuclear fission chain reaction was fast neutrons. This type of nuclear reactor is used to advantage as a converter or a breeder in which some of the neutrons produced in the core are utilized to breed fuel. However, such fast reactors possess certain undesirable operating features. One of these features is due to the fact that the fission cross section of certain fissile materials used, such as uranium-235($U^{235}$) or plutonium-239($Pu^{239}$), is markedly reduced since the neutron energy spectrum thereof lies in a high energy region. On the other hand, fertile material such as uranium-238($U^{238}$) or thorium-232($Th^{232}$) is effectively fissioned by fast neutrons; however, with thermal reactors such nuclear fission of the fertile material is very small. In order that the nuclear fission chain reaction may be maintained with fast neutrons, the fuel concentration must be increased correspondingly to the decrease in the fission cross section of the fissile material. This necessarily requires a reduction in size of the reactor core and an increase in power density to achieve a reduction in power cost and also necessitates heat removal with an improved efficiency.

Fast reactors of the type having a core designed to maintain a nuclear fission chain reaction with fast neutrons, are generally composed of a core including a fissile material of high concentration as a fuel and a surrounding blanket consisting of mainly fertile materials. Also, with fast reactors, a $U^{238}$–$Pu^{239}$ fuel cycle is preferred from an economical standpoint with respect to the breeding ratio and the fuel availability. For a coolant, a liquid metal having a high heat-transfer coefficient and low moderation and neutron capture characteristics, such as sodium, is used.

Fast reactors, however, involve different problems relative to the operation, safety, stability and structural design of the reactor because of the limited size of the reactor core compared to that of thermal reactors and the relationship of the coolant density to the neutron spectrum in the core. Namely, with fast reactors, particularly with those employing a $U^{238}$–$Pu^{239}$ fuel cycle, the coolant void reactivity effect has a marked tendency to be positive. This is particularly true where the reactor core used is large in size, and tends to have a considerably large positive void coefficient in the central region of the core. The fact that the coolant void coefficient is positive means that the reactivity of the reactor increases as the amount of coolant present in the reactor core is reduced. Such increase in reactivity places the reactor in an extremely dangerous state in cases where the coolant is caused to boil, for example, by a sudden increase in power of the reactor. Also, the fuel core of the fast reactor is markedly small in size compared to that of thermal reactors since the former is constructed with a comparatively compact arrangement of fuel of high concentration, and thus necessitates a closely spaced arrangement of control rods. This apparently makes it necessary to accommodate the control drive system in an extremely limited space and thus complicates the control mechanism.

The following data was obtained with a global or spherical type reactor core of 3000 ltr. volume capacity employing a fuel cycle of $U^{238}$–$Pu^{239}$ and sodium as a coolant.

Critical amount of fuel, kg. _____ 1255
Breeding ratio _____ 1.58
Coolant void effect, $\Delta k$ _____ +0.0179

The composition of the reactor core included 20 volume percent of fuel, 15 volume percent of steel as structural material, and 65 volume percent of coolant sodium. This global core was surrounded by a blanket which had a thickness of 40 cm. and inclued 40 volume percent of $U^{238}$, 15 volume percent of steel and 45 volume percent of sodium. The coolant void coefficient given above corresponds to the variation in reactivity when 40 percent of the sodium in the reactor core was lost.

The present invention has for its object to facilitate the control of the nuclear reaction in fast reactors and also to make it possible to perform such control with an improved accuracy.

Another object of the present invention is to improve the reactor safety particularly with respect to problems due to a coolant void.

According to the present invention, there is provided a control system for a fast reactor comprising a plurality of control tubes at least a portion of which are arranged so as to be distributed exterior of the central portion of the reactor core or its blanket. The control tubes are employed in place of conventionally used control rods of neutron absorber and communicate at least at one end with the exterior of the reactor core or its blanket or with void spaces formed in the core or its blanket. The control system further includes means for controllably conducting into and out of the control tubes a control material of fluid form including a neutron absorber, neutron-moderator, or neutron reflector, or fissile material or combinations of these materials while at all times maintaining a portion ot control tubes, and particularly a portion thereof located relatively close to the exterior of the reactor core or the void spaces formed therein, in a vacant state.

The foregoing and other objects, features and advantages of the present invention will become more apparent from the following description when taken in conjunction with the accompanying drawings, in which:

BRIEF DESCRIPTION OF THE DRAWINGS

FIG. 3b is a transverse cross section taken along the line A—A in FIG. 3a;

FIG. 4b is a transverse cross section taken along the line B—B in FIG. 4a;

FIG. 5b is a transverse cross section taken along the line C—C in FIG. 5a.

DETAILED DESCRIPTION OF PREFERRED EMBODIMENTS

Figure 1:
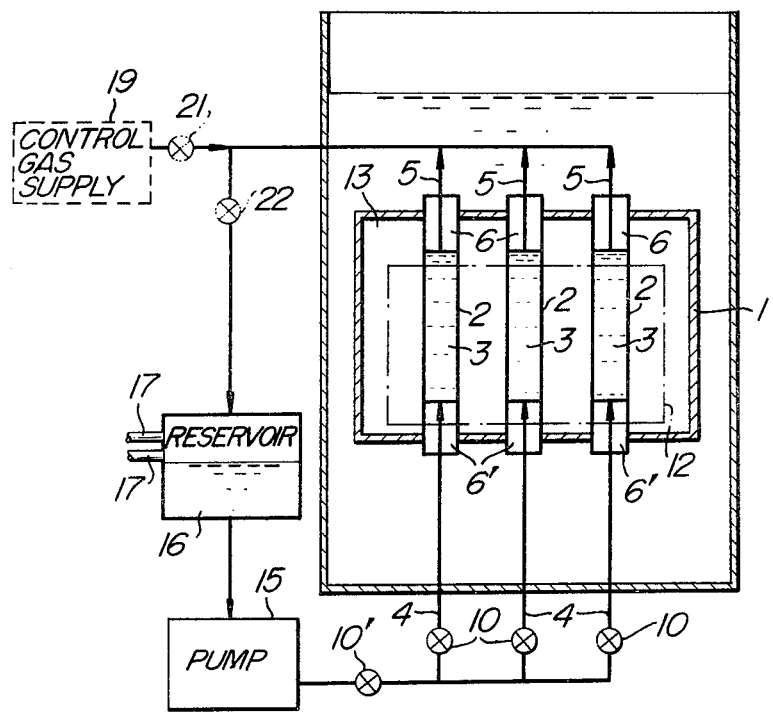
FIG. 1 is a schematic vertical cross-sectional diagram of a reactor core, illustrating one embodiment of a control system according to the invention.

Referring to the drawings, including the several figures, reference numeral 1 indicates the outline of the reactor core; 2 indicates a plurality of control tubes arranged in the core; 3 indicates the control material of liquid form including either a neutron-absorber, a neutron-moderator, a fissile material, a neutron-reflector or any combinations of these materials. Reference numerals 4 and 5 indicate the inlet and outlet sections through which the control material is conducted into and out of the control tubes, respectively; 6 and 6' indicate the vacant spaces in the control tubes 2; dash-dot box-shaped outline 12 represents the space within reactor core 1 occupied generally by the fuel rods, the blanket and control tubes 2; 13 represents the void spaces which may be formed by the void spaces 6 and 6' of adjacent control tubes formed within the reactor core by design for neutron communication with the void spaces 6 and 6' in the control tubes and the exterior of the core. The fuel rods and blanket (if used) have not been illustrated in FIG. 1 in order not to complicate the drawings unduly. The fuel rods are shown in cross-section at 14 in FIG. 2, however, in order to depict the overall arrangement.

The control tubes 2 have the inlets 4 thereof connected through individual regulator valves 10, master regulator valve 10' and suitable conduits to the output from a pump 15 supplied from a reservoir 16 of suitable control material in liquid form. The outlet ends 5 of control tubes 2 are connected through suitable conduits to recirculate the liquid control material back to reservoir 16. Supply conduits 17 are provided for replenishing the supply of liquid control material in the reservoir 16. Other, similar liquid level controlling arrangements of the same general type which could be employed in place of the pump and reservoir arrangement shown in FIG. 1, are described in British Pat. 799,001, French Pat. 1,269,659 or German Pat. 1,125,562, for example.

FIG. 1 also illustrates an alternative liquid level control arrangement wherein a control gas supply shown in dotted outline form at 19 is connected through a cut-off valve 21 to the outlet sections 5 of each of the control tubes 2, and a cut-off valve 22 is included in the return path to the reservoir 16. The manner of operation of this alternative arrangement will be described more fully hereinafter following the description of operation of the main arrangement.

Figure 2:
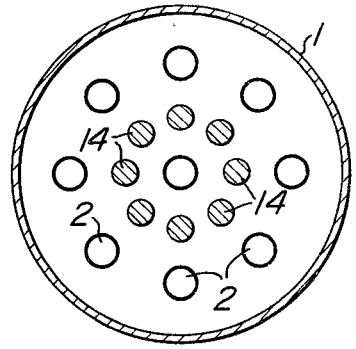
FIG. 2 is a schematic transverse cross-sectional diagram of the reactor core shown in FIG. 1.

FIGS. 1 and 2 illustrates a preferred form of control system according to the present invention. This system includes an arrangement of control tubes 2 wherein one control tube extends axially through the center of the reactor core 1, and is cylindrical in form. A number of similar control tubes are arranged symmetrically with respect to the central axis of the core, and have their longitudinal axes extend in the same direction as the longitudinal axis of the core. The control tubes 2 are all in communication at one end with the liquid reservoir 16 holding a supply of liquid control material, for example, a solution of cadmium dissolved in an appropriate concentration. As illustrated, the control tubes 2 are so arranged in the core of the fast reactor that liquid control material is fed through the inlet sections 4 into the respective control tubes 2 by pump 15 and regulator valves 10' and 10. By appropriate adjustment of the regulator valves 10 and 10', the liquid level therein may be varied for the purpose of controlling the reactor. More precise control of the reactor reactivity can also be obtained by varying the concentration of the control material 3 or by employing a varying combination of control materials in addition to varying the liquid level in the control tubes 2.

Should it be desired to control the liquid level of the liquid control material 3 in the control tubes 2 to a finer degree, the alternative arrangement employment control gas supply 19 may be used. With this arrangement, the cut off valve 22 is closed to the reservoir 16 and the valve 21 is then employed as a regulator valve to supply a back gas pressure to the control tubes 2 through the outlet sections 5. The inlet regulator valves 10 and 10' are then adjusted to just maintain the liquid level of the control material within the control tubes 2 at an optimum average level and the regulator valve 21 is adjusted to finely control the level of the liquid control material in the control tubes 2.

Figure 1A:
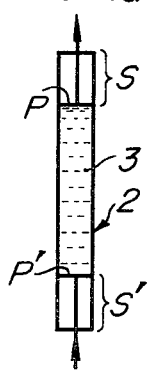
FIG. 1a is an enlarged diagrammatic view of one of the control tubes comprising a part of the control system shown in FIG. 1.

The effect of controlling the liquid level of the control material 3 in the control tubes 2 can best be appreciated in conjunction with FIG. 1a of the drawings. From an examination of FIG. 1a it will be appreciated that by appropriate adjustment of the level of the liquid control material 3, the amount of void space indicated by the letters S and S' formed in each end of the respective control tubes can be controlled. It will be noted in FIG. 1 that this space S and S' in effect communicates with the void spaces 13 formed within the core 1 by design. This is particularly true of the control tubes 2 which are located exteriorly of the central axis portion of the core. Thus, it will be appreciated that by controlling the level of the liquid control material 3 in the control tubes 2, particularly with respect to those control tubes arranged so as to be distributed exterior of the central axis portion of the core, spaces are formed within the control tube which in conjunction with the void spaces 13 in the reactor core provide radially extending paths from the central portion of the core which are void of liquid control material. The ability to provide and control the extent of these radially extending paths makes it much easier and safer to control the coolant void coefficient during operation of the reactor.

Figure 3A:
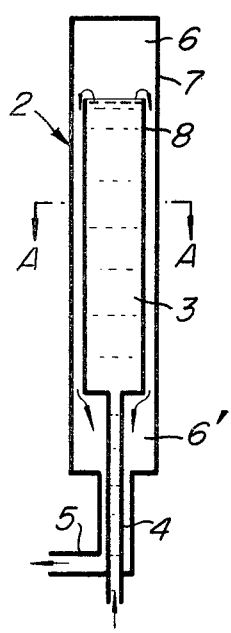
FIG. 3a is a vertical sectional view of one form of a control tube constructed according to the present invention and suitable for use in the control system shown diagrammatically in FIG. 1.
Figure 3B:

One form of a suitable control tube 2 embodying the present invention is shown in FIGS. 3a and 3b and is intended for use in a core structure such as that shown in FIGS. 1 and 2. The control tube 2 is of a double structure designed to define a space 6 void of liquid control material at its top and including concentric inner and outer tubes 8 and 7, which are in communication with each other at their top, as illustrated. The double tube structure may alternatively or additionally have a space 6' void of liquid control material at its bottom. Control material 3 of liquid form is fed into the tube structure through the inner 8 or outer 7 tube and led out through the outer or inner tube for circulation through the structure. A control valve such as 10 in FIG. 1 disposed in the inlet section 4 can be used to control the level of the liquid control material in the inner tube 8 or outer tube 7, as the case may be.

Figure 4A:
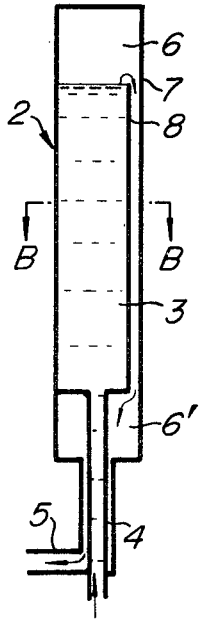
FIG. 4a is a vertical sectional view similar to FIG. 3a illustrating another form of control tube constructed according to the invention.
Figure 4B:
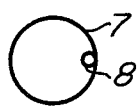

FIGS. 4a and 4b illustrate another double tube structure which includes an outer tube 7 and an inner tube 8 arranged eccentrically to conduct gaseous fluid into and out of the structure for controlling the liquid level therein. In this structure, gaseous fluid is fed through the inner tube 8 of the control tube to control the extent of the space 6 which is void of liquid control material. By changing the pressure of the gaseous fluid in this space, the level of the liquid control material 3 is regulated. In practice, such means as those disclosed in German Pat. No. 1,125,562 to Schmale may be employed for this purpose, or a regulating valve such as 21 in FIG. 1 may be conected to control the gaseous fluid supplied to inner tube 8. This tube structure has a vacant space 6 and 6' at both its top and bottom which is void of the liquid control material. In use the tube structure is arranged with the spaces 6 and 6' positioned relatively close to the void spaces 13 in the reactor core or the periphery of the reactor core to facilitate leakage of neutrons to the exterior thereof both along radial paths and axial paths extending from the central axis of the core. Thus, when a sodium void is formed, any increase in reactivity due to the coolant void effect can be effectively prevented.

With the core reactivity control employing such control tubes, it is to be noted that, though the reactor core at all times includes an excess of structural material, the presence of such excessive structural material has no significant influence upon the neutron economy since the absorption of fast neutrons in such material is limited compared to that of thermal neutrons.

Figure 5A:
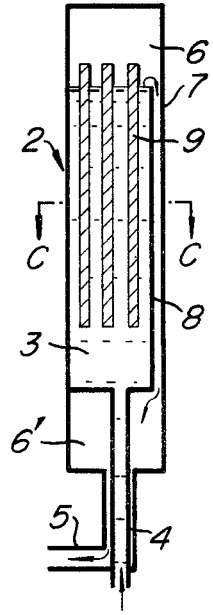
FIG. 5a illustrates a further form of control tube embodying the present invention.
Figure 5B:
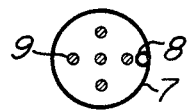

FIGS. 5a and 5b illustrate a further construction for the control tubes 2 having rods 9 of control material such as beryllium oxide fixedly arranged therein in a manner so that a liquid form of another control material may move around the periphery of the rods 9. Control of the liquid level of the liquid control material 3 can be achieved with a suitable regulating valve such as 10 shown in FIG. 1 disposed in the inlet section 4, and/or with a valve 21 in the gaseous fluid supply line to inner tube 8.

It is to be understood that the control tubes 2 according to the present invention may also take the form of multiple tubes having three or more concentric tube walls or may include a single tube with a number of minor tubes arranged therein to accommodate respective kinds of control material. In these cases, arrangement may be made to allow movement of only one or more selected control materials for the purpose of performing precise reactor control.

Various moderator materials are usable as the liquid control material in the present invention, and sodium or the like material used as a coolant can also be utilized as a control material since with fast reactors a satisfctory moderation effect is obtainable even with medium weight elements.

It will be apparent to those skilled in the art that besides the above-described examples, many other embodiments of the present invention can be utilized having different cross-sectional configurations of the control tubes and different combinations of control materials arranged or fed therein and that such control tubes may also be used in combination with conventional control rods. One of the important advantages of the present invention is that complicated operations for independent control of the respective control tubes or associative operation thereof can be performed by simple mechanical means, for example, with regulator valves 10 or 21 because of the use of control material of liquid form. Another advantage of the control system of the present invention is that there is no need of arranging many separate driving mechanisms in a limited space for driving control rods in a conventional manner and that the reactor control can now be performed even without use of any such control rods at lower manufacturing costs. In addition to these advantages, the present invention has further features that it enables stable and safe operation of fast reactors with ease by the provision of void spaces within the reactor core whose extent can be readily varied to thereby control adverse operating conditions in the reactor due to coolant void effect, etc.

We claim:

1. A control system for a fast nuclear reactor comprising a core having a plurality of control tubes disposed therein at least a portion of which are arranged so as to be distributed exterior of the central axial portion of the core means for feeding a control material of liquid form to the control tubes, and means for controlling the level of liquid control material in the control tubes under all conditions of operation, means for providing spaces at each end of the control tubes and within the outer boundaries of the core that are maintained void of the liquid control material at least within the exteriorly distributed control tubes, said void spaces having a cross sectional area close to the cross-sectional area of the control tubes whereby the void spaces provide radially extending paths from the central portion of the core which are void of liquid control material.

2. A control system according to claim 1 wherein the means for controlling the level of the liquid control material controls the extent of the spaces that are void of the liquid control material.

3. A control system according to claim 2 wherein the means for controlling the level of the liquid control material is a gaseous fluid supplied to the control tubes for forming the spaces that are void of the liquid control material and controlling its extent.

4. A control system according to claim 1 wherein stationary rods of solid control material are disposed in each control tube in addition to the liquid control material and are surrounded at least in part by the liquid control material to the extent determined by the level of the liquid control material.

5. A control system according to claim 1 wherein each of the control tubes comprises inner and outer elongated containers arranged with the longitudinal axis thereof extending in the same direction as the longitudinal axis of the core, the outer elongated container having one end closed and a single access opening through the remaining end to provide for the flow of liquid control material or gaseous fluid through the outer container, and the inner elongated container being disposed within the outer container and containing the liquid control material, one of the ends of the inner container being open to the interior of the outer elongated container and having an access opening in the remaining end thereof to provide for the flow of liquid control material therethrough with both ends of the inner container being spaced from the corresponding end of the outer container to provide spaces within the control tube that essentially are void of liquid control material.

6. A control system according to claim 5 wherein the inner and outer containers are concentrically and coaxially arranged cylindrically-shaped members with the inner container having a smaller diameter than the outer container.

7. A control system according to claim 5 wherein the inner and outer containers have very nearly the same cross-sectional dimensions with the spaced-apart ends of the inner and outer containers defining the void spaces at each end of the control tube being interconnected by a small cross-sectional dimension passageway.

8. A control system according to claim 7 wherein stationary rods of solid control material are disposed in the inner container of each control tube in addition to the liquid control material and are surrounded at least in part by the liquid control material to the extent determined by the level of the liquid control material.

References Cited

UNITED STATES PATENTS

| | | | |
|---|---|---|---|
| 2,999,059 | 9/1961 | Treshow | 176—42 |
| 3,183,168 | 5/1965 | Bell | 176—42 |
| 3,212,986 | 10/1965 | Pennington | 176—86 |
| 3,261,755 | 7/1966 | Mostert | 176—86 |
| 3,284,307 | 11/1966 | Schortmann | 176—22 |
| 3,383,285 | 5/1968 | Ackroyd et al. | 176—42 |

FOREIGN PATENTS

| | | |
|---|---|---|
| 659,606 | 8/1965 | Belgium. |
| 1,269,659 | 7/1961 | France. |
| 1,487,533 | 5/1967 | France. |
| 1,125,562 | 3/1962 | Germany. |
| 799,001 | 7/1958 | Great Britain. |
| 380,253 | 9/1964 | Switzerland. |

CARL D. QUARFORTH, Primary Examiner

H. E. BEHREND, Assistant Examiner

U.S. Cl. X.R.

176—22, 33, 42